(12) United States Patent
Narumi et al.

(10) Patent No.: US 12,440,920 B2
(45) Date of Patent: Oct. 14, 2025

(54) LASER PROCESSING HEAD AND LASER PROCESSING DEVICE

(71) Applicant: Panasonic Intellectual Property Management Co., Ltd., Osaka (JP)

(72) Inventors: Keiji Narumi, Saitama (JP); Mitsuoki Hishida, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 608 days.

(21) Appl. No.: 17/938,357

(22) Filed: Oct. 6, 2022

(65) Prior Publication Data
US 2023/0023205 A1 Jan. 26, 2023

Related U.S. Application Data

(63) Continuation of application No. PCT/JP2021/014947, filed on Apr. 8, 2021.

(30) Foreign Application Priority Data

Apr. 27, 2020 (JP) .................. 2020-078183

(51) Int. Cl.
B23K 26/06 (2014.01)
(52) U.S. Cl.
CPC .................. B23K 26/0648 (2013.01)
(58) Field of Classification Search
CPC ............ B23K 26/06; B23K 26/0604; B23K 26/0608; B23K 26/062; B23K 26/0648; B23K 26/0665; B23K 26/07; B23K 26/073; B23K 26/0869; B23K 26/0884; B23K 26/707
See application file for complete search history.

(56) References Cited

U.S. PATENT DOCUMENTS

| 2012/0255936 | A1* | 10/2012 | Tagliaferri | H01S 3/08031 219/121.6 |
| 2016/0079724 | A1* | 3/2016 | Reeves-Hall | H01S 3/23 372/6 |
| 2016/0167166 | A1 | 6/2016 | Nagano et al. | |
| 2017/0082811 | A1* | 3/2017 | Kadoya | G02B 6/42 |
| 2017/0259372 | A1* | 9/2017 | Kim | B23K 26/0823 |

FOREIGN PATENT DOCUMENTS

JP 2014-079802 5/2014

OTHER PUBLICATIONS

International Search Report of PCT application No. PCT/JP2021/014947 dated Jun. 22, 2021.

* cited by examiner

Primary Examiner — Hung D Nguyen
(74) Attorney, Agent, or Firm — Wenderoth, Lind & Ponack, L.L.P.

(57) ABSTRACT

Collimator lens (21) and focusing lens (22) are provided with AR coating (23). AR coating (23) has a first reflectance for reflecting a first laser light higher than a second reflectance for reflecting a second laser light. Detector (25) detects diffusion light (DL) diffused by collimator lens (21) and focusing lens (22). Detector (25) has a first light receiving sensitivity for receiving the first laser light lower than a second light receiving sensitivity for receiving the second laser light.

5 Claims, 4 Drawing Sheets

LASER PROCESSING HEAD AND LASER PROCESSING DEVICE

This application is a continuation of the PCT International Application No. PCT/JP2021/014947 filed on Apr. 8, 2021, which claim the benefit of foreign priority of Japanese patent application No. 2020-078183 filed on Apr. 27, 2020, the contents all of which are incorporated herein by reference.

TECHNICAL FIELD

The present disclosure relates to a laser processing head and a laser processing device.

BACKGROUND ART

Conventionally, a laser processing device has been known that includes a laser light source that outputs laser light including a plurality of different wavelength components, an optical fiber connected to the laser light source, and a laser processing head that irradiates a processing target with laser light transmitted through the optical fiber (see, for example, Patent Literature 1).

CITATION LIST

Patent Literature

PTL 1: Unexamined Japanese Patent Publication No. 2014-79802

SUMMARY OF THE INVENTION

Technical Problem

An output of laser light for processing may vary due to degrading of an optical system of a laser light source, a shift of an optical axis, or the like. The inventor of the present application has come to an idea of detecting diffusion light coming from a lens constituting an optical system of a laser processing head to check a variation of output of laser light.

This idea however raises cost because, to detect diffusion light of laser light including widely different wavelengths, such as infrared laser light and blue laser light, it is necessary to separately provide a sensor designed to maximize light receiving sensitivity for infrared laser light and a sensor designed to maximize light receiving sensitivity for blue laser light.

In addition, the cost rises by providing an anti reflection coating (AR coating) that has low reflectance for both infrared laser light and blue laser light on a lens of an optical system to allow laser light including infrared laser light and blue laser light pass through the lens.

The present disclosure has been made in view of this point. An object of the present disclosure is to realize accurate detection of a variation of output of laser light including different wavelengths with suppressed cost.

Solution to Problem

A first invention is a laser processing head that emits laser light including a first laser light having a first wavelength and a second laser light having a second wavelength, the laser processing head including a transmission fiber that transmits the laser light, a collimator lens that collimates the laser light transmitted through the transmission fiber, a focusing lens that condenses the laser light collimated by the collimator lens, and a detector that detects diffusion light diffused by at least one of the collimator lens and the focusing lens, where at least one of the collimator lens and the focusing lens is provided with an AR coating, the AR coating has a first reflectance for reflecting the first laser light higher than a second reflectance for reflecting the second laser light, and the detector has a first light receiving sensitivity for receiving the first laser light lower than a second light receiving sensitivity for receiving the second laser light.

In the first invention, the AR coating is provided on at least one of the collimator lens and the focusing lens to diffuse diffusion light. The AR coating has the first reflectance higher than the second reflectance. The detector detects diffusion light. The detector has the first light receiving sensitivity lower than the second light receiving sensitivity.

As described above, the cost can be suppressed by making the AR coating to have the first reflectance higher than the second reflectance, that is, the second reflectance lower than the first reflectance as compared with an AR coating having a low first reflectance and a low second reflectance.

Since the first reflectance is higher than the second reflectance, the entering amount of diffusion light having a first wavelength into a detector is larger than the entering amount of diffusion light having a second wavelength into the detector. Thus, with the detector having the first light receiving sensitivity lower than the second light receiving sensitivity, the variation of total power of laser light including the first wavelength and the second wavelength can be detected accurately.

A second invention is the first invention with the first light receiving sensitivity being 1/a where a is the first reflectance and the second light receiving sensitivity being 1/b where b is the second reflectance.

The second invention has the first light receiving sensitivity of 1/a where a is the first reflectance and the second light receiving sensitivity of 1/b where b is the second reflectance. By setting the light receiving sensitivity of the detector to be lower for a higher reflectance of laser light, the variation of total power of laser light can be detected accurately.

A third invention is the first or second invention with the output of the second laser light being higher than the output of the first laser light.

The third invention has the output of the second laser light higher than the output of the first laser light. The AR coating has the first reflectance of the first laser light higher than the second reflectance of the second laser light. This causes the first laser light having a low output entering the detector by a larger amount than the second laser light having a high output, and thus the load on the detector can be reduced.

A fourth invention is a laser processing device including the laser processing head according to any one of the first to third inventions, a laser oscillator that is connected to an inlet end of the transmission fiber and oscillates laser light including the first wavelength and the second wavelength, and a controller that controls an output of the laser oscillator based on a detection value detected by the detector.

In the fourth invention, the laser processing device is configured that the laser light oscillated by the laser oscillator enters the laser processing head according to any one of the first to third inventions via the transmission fiber. The controller controls the output of the laser oscillator based on the detection value detected by the detector.

This enables, when the detection value is smaller than a predetermined threshold value, for example, the output of the laser light to be corrected by increasing the output of the laser oscillator.

A fifth invention is the fourth invention including a notification unit that performs a predetermined notification operation based on the detection value detected by the detector.

In the fifth invention, the notification unit performs the predetermined notification operation based on the detection value detected by the detector. For example, when the detection value is smaller than the predetermined threshold value, it is determined that the output of the laser light has decreased and a notification operation such as sounding an alarm buzzer, turning on an alarm lamp, and displaying an alarm message is performed.

Thus, an operator can determine the timing for maintenance of the laser processing device based on the predetermined notification operation.

Advantageous Effect of Invention

According to the present disclosure, a variation of output of laser light including different wavelengths can be accurately detected.

DESCRIPTION OF EMBODIMENT

Exemplary embodiments of the present disclosure will be described below with reference to the drawings. The following description of preferable exemplary embodiments are merely examples in nature, and are not intended to limit the present disclosure, its application, or its use.

<Configuration of Laser Processing Device>

Figure 1:
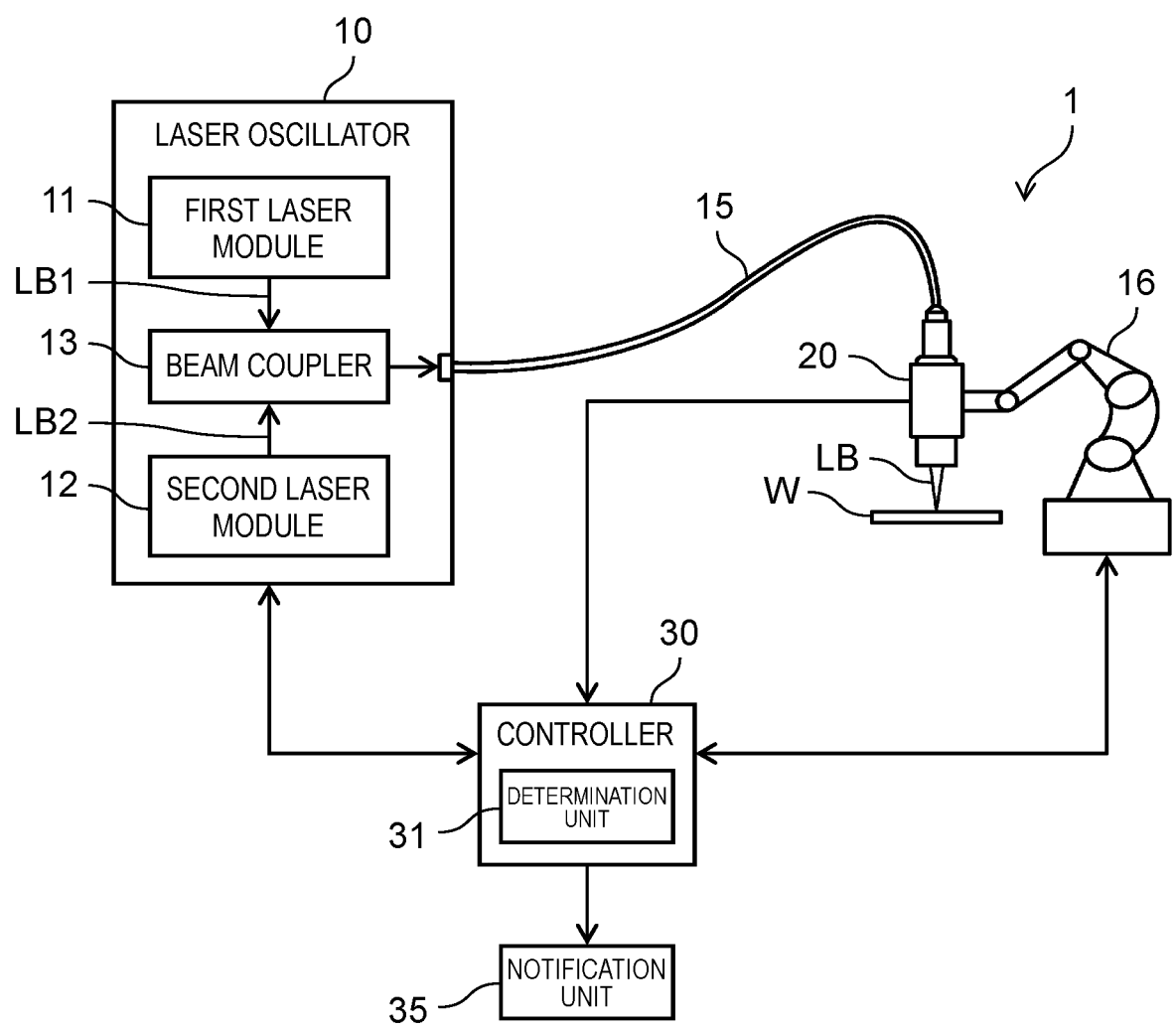
FIG. 1 is a schematic configuration diagram of a laser processing device according to an exemplary embodiment of the present disclosure.

As illustrated in FIG. 1, laser processing device 1 includes laser oscillator 10, transmission fiber 15, laser processing head 20, robot 16, and controller 30.

Laser oscillator 10 is connected to an inlet end of transmission fiber 15. Laser oscillator 10 includes first laser module 11, second laser module 12, and beam coupler 13.

First laser module 11 oscillates first laser light LB1 having a first wavelength. First laser light LB1 is, for example, blue laser light. First laser light LB1 enters beam coupler 13.

Second laser module 12 oscillates second laser light LB2 having a second wavelength. An output of second laser light LB2 is higher than an output of first laser light LB1. Second laser light LB2 is, for example, infrared laser light. Second laser light LB2 enters beam coupler 13.

Beam coupler 13 couples first laser light LB1 and second laser light LB2 to create a single laser light LB. Coupled laser light LB created by beam coupler 13 is condensed by a condenser lens (not illustrated) and then enters transmission fiber 15.

As laser oscillator 10, for example, a solid-laser light source, a gas laser light source, or a fiber laser light source can be used. Laser oscillator 10 may be a semiconductor laser light source that directly uses emitted light of a semiconductor laser, or a semiconductor laser array including a plurality of laser light emitters.

Laser processing head 20 is connected to an emission end of transmission fiber 15. Laser light LB emitted from laser oscillator 10 is transmitted to laser processing head 20 through transmission fiber 15.

Laser processing head 20 is attached to robot 16. Laser processing head 20 can change the position from which laser light LB is emitted and the focal position of laser light LB with respect to workpiece W by operating robot 16.

Laser oscillator 10, laser processing head 20, and robot 16 are connected to controller 30. Controller 30 controls not only the moving speed of laser processing head 20 but also starting and stopping of output of laser light LB, output intensity of laser light LB, and the like.

Notification unit 35 is connected to controller 30. Notification unit 35 performs a predetermined notification operation, for example, sounding an alarm buzzer, turning on an alarm lamp, displaying an alarm message, or the like.

Controller 30 includes determination unit 31. As will be described in detail later, determination unit 31 determines the variation of output of laser processing head 20.

<Configuration of Laser Processing Head>

Figure 2:
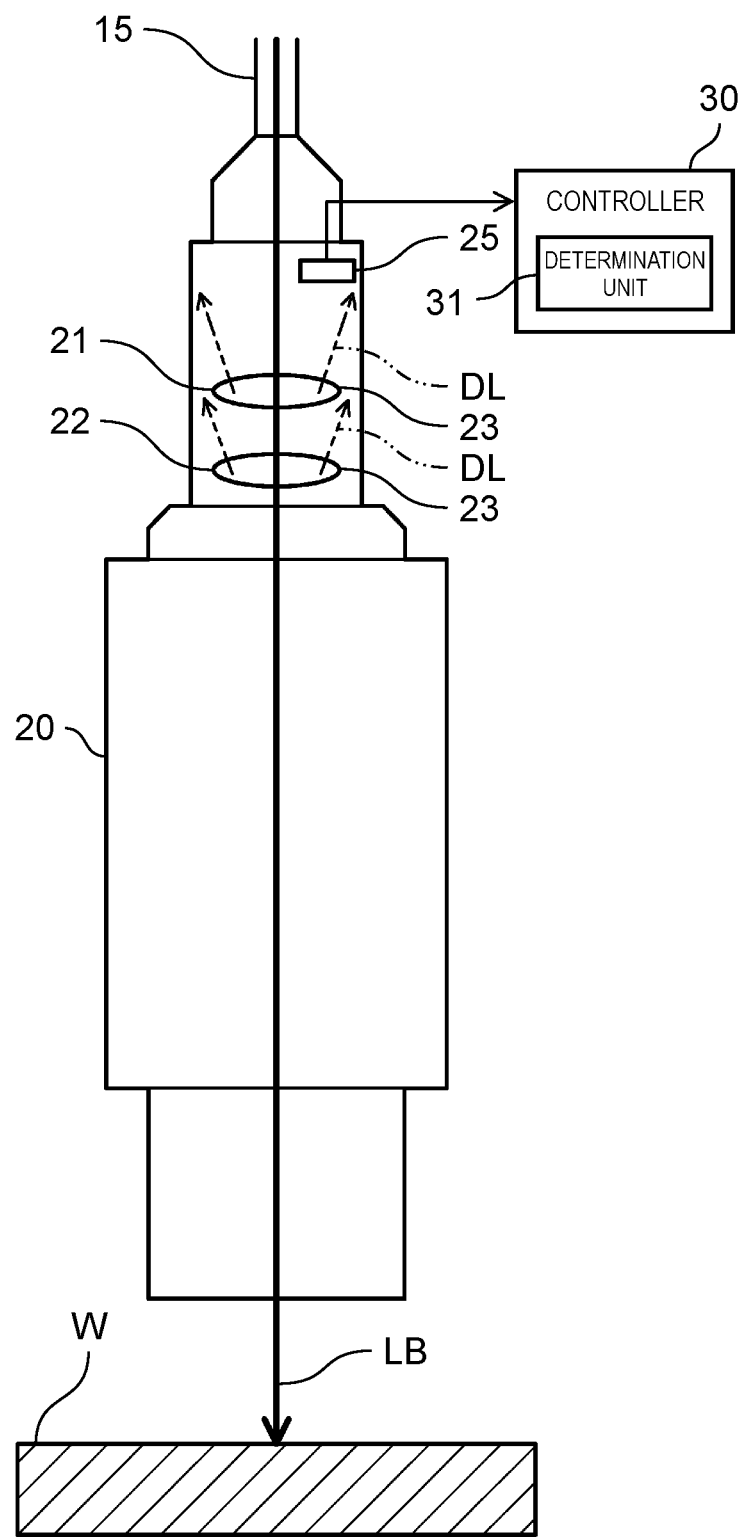
FIG. 2 illustrates a configuration of a laser processing head.

As illustrated in FIG. 2, laser processing head 20 includes collimator lens 21, focusing lens 22, and detector 25.

Collimator lens 21 collimates laser light LB emitted from the emission end of transmission fiber 15.

Focusing lens 22 condenses laser light LB collimated by collimator lens 21. Laser light LB condensed by focusing lens 22 is emitted to workpiece W.

When laser light LB passes through collimator lens 21 and focusing lens 22, a portion of laser light LB is diffused.

Detector 25 detects diffusion light DL diffused by collimator lens 21 and focusing lens 22. Detector 25 has a first light receiving sensitivity for receiving first laser light LB1 lower than a second light receiving sensitivity for receiving second laser light LB2. A detection value detected by detector 25 is sent to controller 30.

Figure 3:
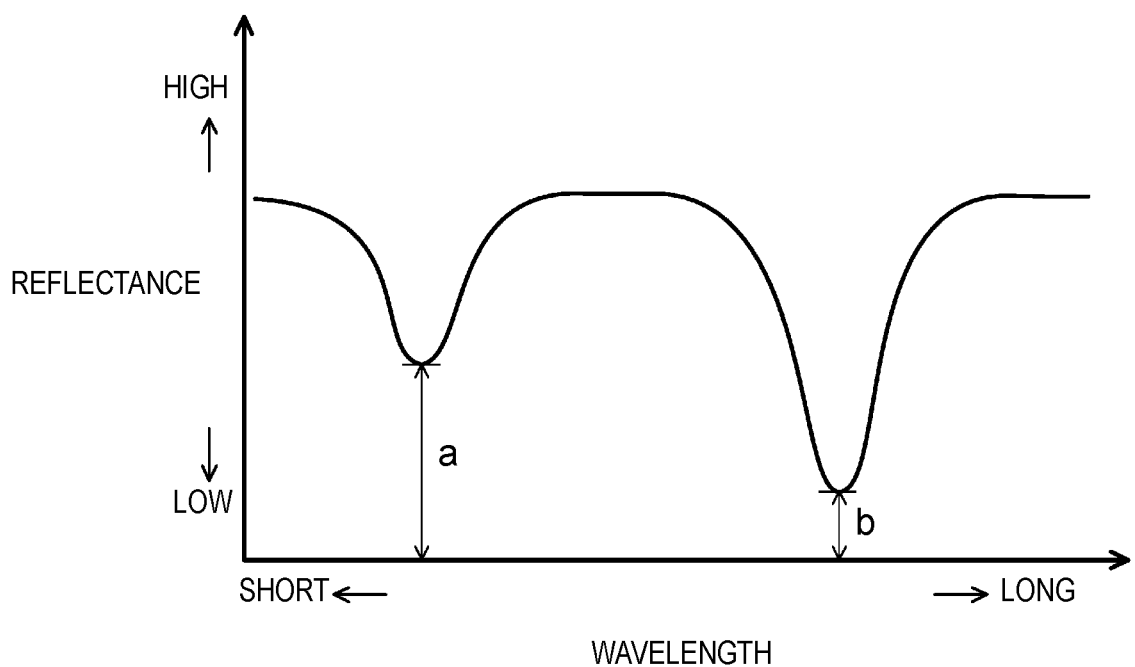
FIG. 3 is a chart illustrating a relationship between the wavelength of laser light and reflectance of AR coating.

AR coating 23 is provided to collimator lens 21 and focusing lens 22. AR coating 23 has first reflectance a for reflecting first laser light LB1 higher than second reflectance b for reflecting second laser light LB2 (see FIG. 3).

With regard to AR coating 23, making first reflectance a higher than second reflectance b, that is, making second reflectance b lower than first reflectance a, as described above, may suppress cost as compared with making both first reflectance a and second reflectance b low.

Since first reflectance a is higher than second reflectance b, the entering amount of diffusion light DL having the first wavelength into detector 25 is larger than the entering amount of diffusion light DL having the second wavelength into detector 25.

Thus, by making detector 25 to have the first light receiving sensitivity lower than the second light receiving sensitivity, the variation of total power of laser light LB including the first wavelength and the second wavelength can be detected accurately.

Specifically, when the first reflectance of AR coating 23 is a, the first light receiving sensitivity of detector 25 is 1/a.

Figure 4:
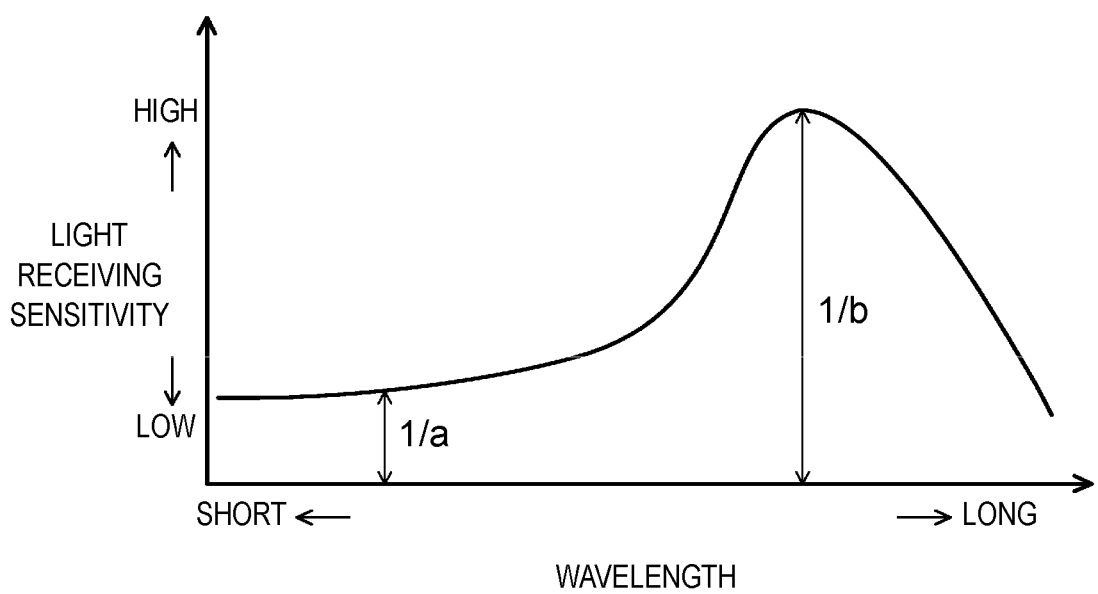
FIG. 4 is a chart illustrating a relationship between the wavelength of laser light and light receiving sensitivity of a detector.

When the second reflectance of AR coating 23 is b, the second light receiving sensitivity of detector 25 is 1/b (see FIG. 4).

By setting the light receiving sensitivity of detector 25 to be lower for a higher reflectance of AR coating 23 as described above, the variation of total power of laser light LB can be detected accurately.

In addition, with first laser light LB1 being blue laser light and second laser light LB2 being infrared laser light, the output of second laser light LB2 is higher than the output of first laser light LB1.

AR coating 23 has first reflectance a for first laser light LB1 higher than second reflectance b for second laser light LB2. This causes first laser light LB1 having a low output to enter detector 25 by a larger amount than second laser light LB2 having a high output, and thus the load on detector 25 can be reduced.

Controller 30 controls the output of laser oscillator 10 based on the detection value detected by detector 25. Specifically, controller 30 includes determination unit 31. Determination unit 31 determines the variation of output of laser processing head 20.

Figure 5:
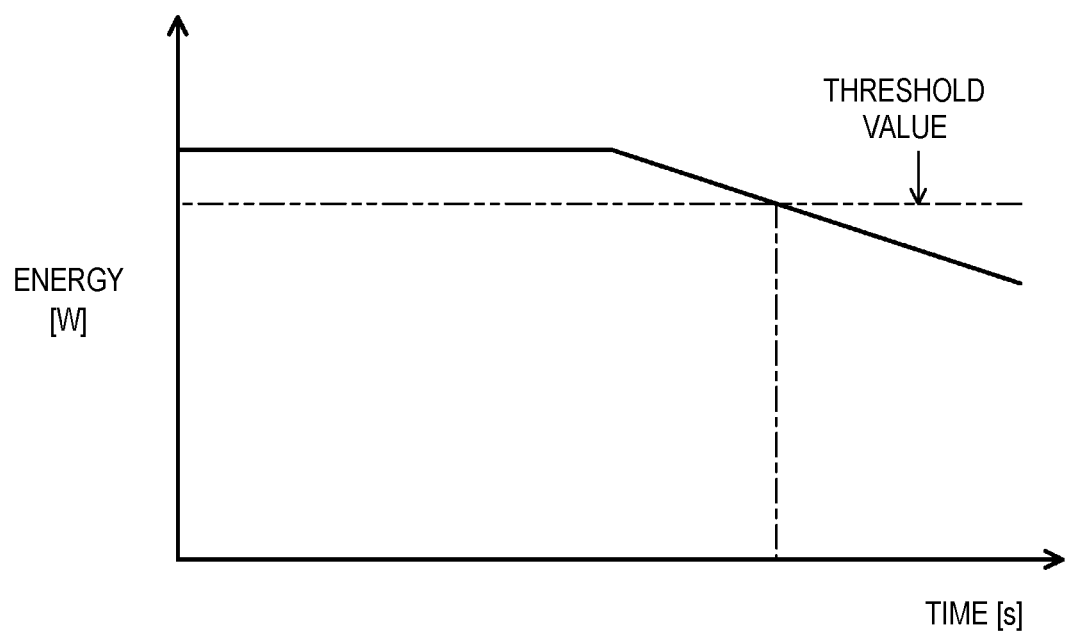
FIG. 5 is a chart illustrating a temporal change in output energy of laser light.

As illustrated in FIG. 5, when a defect such as degrading of an optical system or a shift of optical axis occurs in laser oscillator 10, the output of the laser light LB varies. Thus, determination unit 31 determines whether the energy of diffusion light DL detected by detector 25 is smaller than a predetermined threshold value.

When the energy of diffusion light DL becomes smaller than the threshold value, determination unit 31 determines that an abnormality has occurred in laser oscillator 10.

Then, based on the determination made by determination unit 31, controller 30 corrects the output of laser light LB by increasing the output of laser oscillator 10.

Based on the determination made by determination unit 31, notification unit 35 performs a predetermined notification operation indicating an abnormality of laser oscillator 10 (see FIG. 1). For example, when the detection value detected by detector 25 is smaller than the predetermined threshold value, it is determined that the output of laser light LB has decreased and a notification operation such as sounding an alarm buzzer, turning on an alarm lamp, and displaying an alarm message is performed.

Thus, an operator can determine the timing for maintenance of laser processing device 1 based on the predetermined notification operation.

Other Exemplary Embodiments

The above exemplary embodiment may take the following configuration.

In the present exemplary embodiment, detector 25 detects diffusion light DL diffused by both collimator lens 21 and focusing lens 22, but the present invention is not limited to such configuration. For example, detector 25 may detect diffusion light DL diffused by one of collimator lens 21 and focusing lens 22.

INDUSTRIAL APPLICABILITY

As described above, since the present disclosure enables accurate detection of a variation of output of laser light including different wavelengths, which is a highly practical effect, the present disclosure is very useful and is highly applicable in industries.

REFERENCE MARKS IN THE DRAWINGS 1 laser processing device
10 laser oscillator
15 transmission fiber
20 laser processing head
21 collimator lens
22 focusing lens
23 AR coating
25 detector
30 controller
35 notification unit
DL diffusion light
LB laser light
LB1 first laser light
LB2 second laser light

The invention claimed is:

1. A laser processing head that emits laser light including a first laser light having a first wavelength and a second laser light having a second wavelength, the laser processing head comprising:
a transmission fiber that transmits the laser light;
a collimator lens that collimates the laser light transmitted through the transmission fiber;
a focusing lens that condenses the laser light collimated by the collimator lens; and
a detector that detects diffusion light diffused by at least one of the collimator lens and the focusing lens, wherein
at least one of the collimator lens and the focusing lens is provided with an anti reflection coating (AR coating),
the AR coating has a first reflectance for reflecting the first laser light higher than a second reflectance for reflecting the second laser light, and
the detector has a first light receiving sensitivity for receiving the first laser light lower than a second light receiving sensitivity for receiving the second laser light.

2. The laser processing head according to claim 1, wherein
the first light receiving sensitivity is 1/a where a is the first reflectance, and
the second light receiving sensitivity is 1/b where b is the second reflectance.

3. The laser processing head according to claim 1, wherein an output of the second laser light is higher than an output of the first laser light.

4. A laser processing device comprising:
the laser processing head according to claim 1,
a laser oscillator that is connected to an inlet end of the transmission fiber and oscillates laser light including a first wavelength and a second wavelength, and
a controller that controls an output of the laser oscillator based on a detection value detected by the detector.

5. The laser processing device according to claim 4 further comprising a notification unit that performs a predetermined notification operation based on the detection value detected by the detector.

* * * * *